United States Patent [19]

Stoy et al.

[11] 3,899,546

[45] Aug. 12, 1975

[54] INTUMESCENT COMPOSITIONS CONTAINING AN AMINO BENZENESULFONAMIDE RESIN AND AN EPOXY RESIN

[75] Inventors: William S. Stoy, Princeton; Shirley H. Roth, Highland Park, both of N.J.

[73] Assignee: Cities Service Company, Tulsa, Okla.

[22] Filed: Nov. 1, 1972

[21] Appl. No.: 302,990

[52] U.S. Cl. ...... 260/834; 260/18 PN; 260/30.8 DS; 260/32.6 N; 260/32.8 N; 260/32.8 EP; 260/33.2 EP; 260/33.4 EP; 260/830 P; 260/830 S; 260/831
[51] Int. Cl. .................................. C08g 45/10
[58] Field of Search ..................... 260/834

[56] References Cited
UNITED STATES PATENTS

| | | | |
|---|---|---|---|
| 2,494,295 | 1/1950 | Greenlee | 260/834 |
| 2,847,394 | 8/1958 | Greenlee | 260/834 |
| 3,277,050 | 10/1966 | Pettigrew | 260/831 |
| 3,397,190 | 8/1968 | Toepfl | 260/834 |
| 3,475,353 | 10/1969 | Farber | 260/834 |

OTHER PUBLICATIONS

Chemical Abstracts, Kuwata et al., Vol. 42, P. 6577C, 1948.
Chemical Abstracts, Badische, Vol. 48, P. 10368a–c, 1954.

*Primary Examiner*—Paul Lieberman
*Attorney, Agent, or Firm*—Patricia J. Hogan

[57] ABSTRACT

Intumescent compositions of the invention comprise (A) amine-aldehyde interpolymers wherein at least half of the amine units are derived from a sulfanilamide-type compound, (B) epoxy resins, and (C) curing agents. Preferred compositions are those wherein the interpolymer is a sulfanilamide-formaldehyde copolymer, the epoxy resin is a liquid glycidyl ether epoxy resin, and the curing agent is a polyamide.

8 Claims, No Drawings

INTUMESCENT COMPOSITIONS CONTAINING AN AMINO BENZENESULFONAMIDE RESIN AND AN EPOXY RESIN

BACKGROUND OF THE INVENTION

1. Field of the Invention

This invention relates to intumescent compositions and more particularly relates to such compositions comprising an amine-aldehyde interpolymer, an epoxy resin, and a curing agent.

2. Description of the Prior Art

As disclosed in copending application Ser. No. 291,846, filed Sept. 25, 1972, in the name of Shirley H. Roth, valuable intumescent compositions may be obtained by the use of amine-aldehyde interpolymer intumescent agents wherein the aldehyde units are residues of an alkanal containing 1–5 carbon atoms and at least half of the amine units are residues of an amine corresponding to the formula:

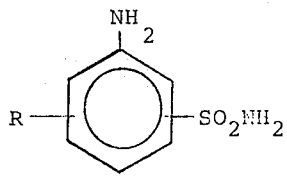

wherein R is hydrogen, alkyl, haloalkyl, alkoxy, haloalkoxy, halo, nitro, acetamido, or sulfonamido. These compositions are satisfactory for many applications but are sometimes more brittle than might be desired. Also, when the intumescent agents are to be used for coating applications, it is frequently desirable to employ them in solution form, but it has been found that the interpolymers have poor solvent release and consequently form films which remain tacky and soft for long periods of time unless dried at elevated temperatures. Attempts to solve this problem by using the dissolved intumescent agents in conjunction with other film-forming binders have generally not been successful.

SUMMARY OF THE INVENTION

An object of this invention is to provide novel intumescent compositions.

Another object is to provide such compositions which are useful in various applications, such as coating, molding, potting, and casting applications.

A further object is to provide such compositions which form clear, glossy coatings or pigmented enamels.

These and other objects are attained by blending an intumescent agent with an epoxy resin and a curing agent, the intumescent agent being an amine-aldehyde interpolymer wherein the aldehyde units are residues of an alkanal containing 1–5 carbon atoms and at least half of the amine units are residues of an amine corresponding to the formula:

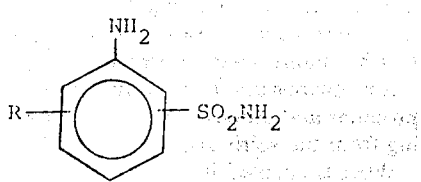

wherein R is hydrogen, alkyl, haloalkyl, alkoxy, haloalkoxy, halo, nitro, acetamido, or sulfonamido.

DESCRIPTION OF THE PREFERRED EMBODIMENTS

The intumescent agents of the invention may be any such amine-aldehyde interpolymers but are preferably such interpolymers having number average molecular weights of about 350–2000. They may be the sulfanilamide-formaldehyde type interpolymers of the prior art or, preferably, the interpolymers of now abandoned copending application Ser. No. 291,847, filed Sept. 25, 1972, in the name of Shirley H. Roth, the teachings of which are incorporated herein by reference.

As indicated above, at least half of the total amine units of the interpolymers are residues of a sulfanilamide-type compound, i.e., a substituted or unsubstituted o-, m-, or p-aminobenzenesulfonamide. When the sulfanilamide-type compound bears an organic substituent, it is preferred that the substituent contain 1–5 carbon atoms. When halo substituents are present, it is preferred that they be chloro or bromo. Exemplary of the amines from which these units may be derived are sulfanilamide, o-aminobenzenesulfonamide, m-aminobenzenesulfonamide, 4-amino-2-ethylbenzenesulfonamide, 2-amino-3-chloromethylbenzenesulfonamide, 3-amino-2-butoxybenzenesulfonamide, 4-amino-3-bromomethyoxybenzenesulfonamide, 4-amino-2-chlorobenzenesulfonamide, 2-amino-4-bromobenzenesulfonamide, 4-amino-2-nitrobenzenesulfonamide, 4-amino-2-acetamidobenzenesulfonamide, 4-amino-1,3-disulfonamidobenzene, etc., and mixtures thereof. Preferably these units are units of sulfanilamide itself.

If desired, the interpolymer may be one in which up to half of the amine units are units derived from a co-condensable amine. Suitable co-condensable amines include, e.g., urea, thiourea, ethyleneurea, melamine, guanidine, aminoguanidine, cyanamide, dicyandiamide, etc., and mixtures thereof. However, the interpolymer is preferably one in which all of the amine units are derived from a sulfanilamide-type compound.

As indicated above, the aldehyde units of the interpolymer are derived from an alkanal containing 1–5 carbon atoms, i.e., formaldehyde, acetaldehyde, propionaldehyde, butyraldehyde, pentaldehyde, and mixtures thereof.

The epoxy resins of the invention may be any of the glycidyl ether epoxy resins. Such resins are well known and are described, e.g., in Henry Lee and Kris Neville, "Epoxy Resins," McGraw-Hill Book Company, Inc. (New York), 1957; Irving Skeist, "Epoxy Resins," Reinhold Publishing Corporation (New York), 1958; William N. Bowie et al., "Epoxy Resins: Market Survey and Users' Reference," Materials Research (Cambridge), 1959; R. A. Allen, "Epoxy Resins in Coatings," Federation of Societies for Paint Technology (Philadelphia), 1972; and Paul M. Craven, "Epoxy Resins," 1968–1969 MODERN PLASTICS ENCYCLOPEDIA, pp. 160, 161, and 170–173, the teachings of which are incorporated herein by reference.

As taught in these references, the glycidyl ether epoxy resins may be liquid or solid, may have epoxide equivalent values of about 140–4000, and are obtained by condensing an epoxy compound, such as epichlorohydrin, dichlorohydrin, butadiene dioxide, diglycidyl ether, etc., with an aliphatic or aromatic polyol, such as bisphenol A [bis(4-hydroxyphenyl) dimethylmethane], tetrachlorobisphenol A, tetrabromobisphenol A, bisphenol F [bis(4-hydroxyphenyl) methane], bis(4-hydroxyphenyl) sulfone, resorcinol, hydroquinone, novolac resins, ethylene glycol, 2,3-butanediol, glycerol, etc. Any such resin may be employed in the practice of the invention, but the liquid resins having epoxide equivalent values of about 140–800 are preferred when clear coatings are desired. Reaction products of epichlorohydrin with bisphenol A or glycerol are sometimes preferred because of their availability.

The curing agents of the invention may be any of the curing agents conventionally used in substantially stoichiometric amounts with epoxy resins. Such agents include, e.g., primary and secondary amines, organic acids and anhydrides, polysulfides, polyamides, phenol-formaldehyde resins, urea-formaldehyde resins, etc., as more fully described in the references mentioned above. The preferred curing agents are those which react with epoxy resins at room temperature, i.e., the amines, polysulfides, and polyamides, particularly the polyamides, such as the reaction products of amines (e.g., diethylene triamine) with vegetable oil fatty acids.

The compositions of the invention are prepared by blending the intumescent agent, epoxy resin, curing agent, and any optional ingredients in any suitable manner, e.g., by liquid or dry blending of the ingredients at ambient or elevated temperatures, by dissolving the intumescent agent in a solvent, mixing the other ingredients therewith, and then evaporating the solvent by air-or oven-drying, etc. The quantities of ingredients employed are such as to provide intumescent agent/epoxy resin weight ratios between about 1/9 and 9/1, preferably about 1–3/1, most preferably about 5/4, and a substantially stoichiometric amount of curing agent.

The compositions may contain up to about 80%, based on the total weight of the composition, of one or more of the other ingredients conventionally used in intumescent and/or epoxy compositions. Such optional ingredients include, e.g., plasticizers, flexibilizers, stabilizers, dispersing agents, pigments, dyes, driers, biocides, anti-foamers, thickeners, protective colloids, fillers, reinforcements, blowing agents, spumifics, intumescing aids, other intumescent agents, flame retardants, thixotropic agents, diluents, etc.

When it is desired to use the compositions in the form of solutions, a solvent is employed in an amount such as to provide a solids content of about 10–90% by weight. Any solvent capable of dissolving the amine-aldehyde interpolymer intumescent agent and the epoxy resin may be employed. Such solvents include, e.g., acetone, dimethylformamide, dimethylsulfoxide, 2-methoxyethanol, dioxane, tetrahydrofuran, etc.

The compositions of the invention, like the epoxy resin compositions of the prior art, may be used for molding, casting, potting, coating, etc. In a preferred embodiment of the invention, coatings are prepared by applying compositions to substrates in any suitable manner, e.g., electrodeposition, knife coating, calendaring, spraying of powdered intumescent composition onto an adhesive surface, spraying of powdered intumescent composition onto a substrate to which it is adhered by subsequent melting and cooling, application of a hot melt, application of a paint, etc., to deposit coatings having dry thicknesses of about 0.001–0.75 inch.

Although, as indicated above, the compositions are useful in other applications, the invention is particularly advantageous in that it permits the formation of clear, glossy intumescent coatings or intumescent pigmented enamels having low moisture sensitivity and good adherence to substrates, such as wood, paper, metal, and plastics.

The following examples are given to illustrate the invention and are not intended as a limitation therof. Unless otherwise specified, quantities mentioned are quantities by weight. The sulfanilamide-formaldehyde copolymer of the examples is a copolymer having a number average molecular weight of about 350–2000 and prepared in accordance with the teachings of the aforementioned copending application Ser. No. 291,847 so that the sulfanilamide units correspond to the formula:

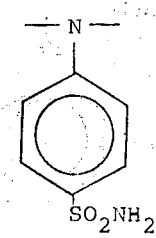

EXAMPLE I

Dissolve 343 parts of a sulfanilamide-formaldehyde copolymer in 260 parts of a 16:13:4 mixture of 2-methoxyethanol, dioxane, and isopropyl acetate. While agitating the solution, add 166 parts of a triglycidyl ether of glycerol having an epoxide equivalent value of 160, 47 parts of tris(2,3-dibromopropyl) phosphate, and 38 parts of hexamethoxymethylol melamine. Then add 63 parts of a polyamide hardener. Apply the composition to a poplar panel and allow it to cure at room temperature to form a tough, adherent, glossy, clear coating having a dry thickness of about 0.007 inch. Test the coated panel in accordance with the 2-foot tunnel test described in H. L. Vandersall, "The Use of a Small Flame Tunnel for Evaluating Fire Hazard," JOURNAL OF PAINT TECHNOLOGY, Vol. 39, No. 55, pp. 494–500 (1967). The panel has a flame spread rating of 2.

EXAMPLE II

Dissolve 310 parts of a sulfanilamide-formaldehyde copolymer in 206 parts of 7:4:2 mixture of 2-methoxyethanol, dioxane, and methyl ethyl ketone. While agitating the solution, add 178 parts of a diglycidyl ether of bisphenol A having an epoxide equivalent value of 190, 47 parts of tris(2,3-dibromopropyl) phosphate, 33 parts of hexamethoxymethylol melamine, and 65 parts of 2-methoxyethanol. When the formula is clear, add 56 parts of a polyamide hardener. Apply the composition to a poplar panel and allow it to cure at room temperature to form a tough, adherent, water-insensitive, clear coating having a dry thickness of about 0.007 inch. Test the coated panel as in Example I. It has flame spread rating of 2.

It is obvious that many variations may be made in the products and processes set forth above without departing from the spirit and scope of this invention.

What is claimed is:

1. A composition comprising (A) about 1–9 parts by weight of an interpolymer of at least one amine with formaldehyde, at least half of the combined amine units of the interpolymer being residues of an amine corresponding to the formula:

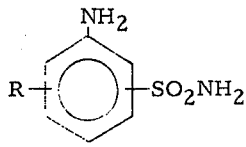

wherein R is hydrogen, alkyl, haloalkyl, alkoxy, haloalkoxy, halo, nitro, acetamido, or sulfonamido, (B) respectively, about 9-1 parts by weight of an epoxy resin which is a polyglycidyl ether of an aliphatic or aromatic polyol, and (C) a substantially stoichiometric amount of a curing agent.

2. The composition of claim 1 wherein at least half of the combined amine units of the interpolymer are sulfanilamide units.

3. The composition of claim 1 wherein all of the combined amine units of the interpolymer correspond to the formula:

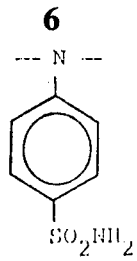

4. The composition of claim 1 wherein the epoxy resin is a liquid glycidyl ether epoxy resin.

5. The composition of claim 4 wherein the epoxy resin is a triglycidyl ether of glycerol.

6. The composition of claim 4 wherein the epoxy resin is a diglycidyl ether of bisphenol A.

7. The composition of claim 1 wherein the curing agent is a polyamide.

8. A process for preparing the composition of claim 1 which comprises dissolving the amine-formaldehyde interpolymer in a solvent, mixing the epoxy resin and curing agent therewith, and evaporating the solvent.

* * * * *